(12) United States Patent
Rieckmann

(10) Patent No.: US 7,564,324 B2
(45) Date of Patent: Jul. 21, 2009

(54) TRANSFORMATIONAL BUS COUPLING

(75) Inventor: Norbert Rieckmann, Hamburg (DE)

(73) Assignee: Airbus Deutschland GmbH (DE)

( * ) Notice: Subject to any disclaimer, the term of this patent is extended or adjusted under 35 U.S.C. 154(b) by 739 days.

(21) Appl. No.: 11/016,792

(22) Filed: Dec. 20, 2004

(65) Prior Publication Data
US 2005/0163112 A1 Jul. 28, 2005

(30) Foreign Application Priority Data
Dec. 23, 2003 (DE) .............................. 103 60 857

(51) Int. Cl.
H01P 5/18 (2006.01)
H03H 7/38 (2006.01)
(52) U.S. Cl. ...................... 333/109; 333/131
(58) Field of Classification Search ......... None
See application file for complete search history.

(56) References Cited

U.S. PATENT DOCUMENTS 6,314,481 B1 * 11/2001 Fehlhaber ................ 710/100
6,327,309 B1    12/2001 Dreyer et al.
6,917,646 B2 *  7/2005 Chianale et al. ............ 375/222

FOREIGN PATENT DOCUMENTS

DE    196 40 172 A1    4/1998
EP    0 467 163 A1     1/1992
EP    0 517 492 A1     12/1992
WO    WO-98/13976     4/1998

OTHER PUBLICATIONS

ARINC Specification 629-4, "Multi-Transmitter Data Bus, Part 1, Technical Description", Apr. 1, 1996.
Data Device Corporation, "Electrical and Layout Considerations For 1553 Terminal Design", 1999.
Ministry of Defence, Defence Standard, "Avionic Data Transmission Interface Systems," Section 3, Issue 2 (part 1) 00-18, supersedes issue 1 dated Oct. 29, 1982.
UK Defence Standardization, "Electronic Index of Defense Standards", 00 Series General Data, Aug. 9, 2004.
ARINC Specification 629-4, "Multi-Transmitter Data Bus, Part 1, Technical Description", Apr. 1, 1996, more pages than the one filed with IDS dated Jun. 7, 2005.

* cited by examiner

Primary Examiner—Benny Lee
Assistant Examiner—Alan Wong
(74) Attorney, Agent, or Firm—Lerner, David, Littenberg, Krumholz & Mentlik, LLP

(57) ABSTRACT

Currently, in transformationally coupled linear data bus systems having separate transmission and reception lines, two transformers are used in order to achieve electrical isolation of data bus and terminal. According to one exemplary embodiment of the present invention, a data bus system is specified in which the terminal is connected via a directional coupler to the data bus lines in order to transmit and receive data via the data bus.

10 Claims, 2 Drawing Sheets

TRANSFORMATIONAL BUS COUPLING

BACKGROUND OF THE INVENTION

The present invention relates to a data bus, preferably for an aircraft. In particular, the present invention relates to a data bus system having a data bus terminal, a terminal for connection and operation using a data bus, and a data transmission method to transmit data between a data bus and a terminal.

Currently, in transformationally coupled linear data bus systems in aviation having separate transmitting and receiving lines, two transformers are used in order to couple the data bus to the terminal and vice versa. Terminals may be aircraft systems, devices, or sensors, for example. The transformational coupling is necessary in safety-critical systems in order to achieve the required operational reliability. The known buzzword in this regard is electrical isolation of data bus and terminal. Such data bus systems are described, for example, in the ARINC 629 Specification MIL STD 1553 Specification.

However, the signal level on the data bus is disadvantageously damped by each and/or each further transformer, since each individual transformer generates reflections which deform the useful signal. Furthermore, the use of transformers is expensive. In addition, if there is a large number of terminals, the transformers represent a relatively large weight.

Direct usage of a transformer for transmission and reception channels through parallel connection of the two spur lines which connect the bus lines to the terminal is not recommended, since the sensitive input circuit of the receiver in the terminal may be overloaded by the high output of the transmitter and, in addition, a possible short-circuit in the receiver of the terminal blocks the transmitter of this terminal.

SUMMARY OF THE INVENTION

A data bus system according to one exemplary embodiment of the present invention, has a data bus and a terminal, the data bus having a first and a second data line. The terminal is connected to the second data line via a directional coupler, in order to transmit and receive data via the data bus.

The use of the directional coupler according to the present invention may advantageously allow the use of one transformer to couple a terminal to the data bus having the bus lines. Reflections which are caused by transformers may advantageously thus be reduced. This improves the signal level on the data lines of the data bus. In addition, a cost-effective data bus system is thus provided.

According to a further exemplary embodiment of the present invention, the terminal has a transmitter and a receiver. The receiver is isolated from the transmitter by the directional coupler. In this way, interference by transmission signals in the receiver is avoided.

According to a further exemplary embodiment of the present invention, the directional coupler is designed in such a way that an input signal coming from the bus lines is relayed to the transmitter and the receiver, an output signal going from the transmitter to the data bus being relayed to the data bus, but not to the receiver.

According to a further exemplary embodiment of the present invention, the directional coupler is designed in such a way that if the transmitter is not transmitting, the input impedance which assigns the data bus is adapted so that no reflections arise on the data bus. In this way, no reflections which deform the useful signal are generated on the data bus.

According to an exemplary embodiment of the present invention, only one transformer is provided in the directional coupler, which essentially has a turn ratio of the primary coil to the secondary coil of 1.141 to 2×1.0. In other words, this means that this transformer has one primary coil and two secondary coils.

According to a further exemplary embodiment of the present invention, the data bus system is tailored or adapted to the requirements in an aircraft. In particular, the data bus system according to the present invention is thus advantageous for an aircraft, since it has a low weight, but achieves the required operational reliability through the electric isolation of data bus and terminal. For example, the terminal may be an aircraft system or a part of an aircraft system.

According to a further exemplary embodiment of the present invention, a terminal for connection and operation using a data bus is specified, the terminal having a directional coupler in order to produce a data connection to and from the bus lines of the data bus. It is to be noted here that instead of two bus lines, multiple bus lines may also be provided. It is also possible to provide only one bus line. This terminal advantageously has high operational reliability. Therefore, this terminal is especially suitable for safety-critical systems, in an aircraft, for example, in particular.

According to a further exemplary embodiment of the present invention, a data transmission method is specified to transmit data between a data bus and a terminal. The data transmission method has the step of connecting the first and second data lines of the data bus to the terminal using a directional coupler in order to transmit and receive data via the data bus. A simple, robust data transmission method is advantageously provided.

BRIEF DESCRIPTION OF THE FIGURES

In the following, exemplary embodiments of the present invention are described with reference to the accompanying figures.

DETAILED DESCRIPTION

In the following, the present invention is described in greater detail with reference to a data bus system, which is preferably usable in an aircraft. However, it is to be noted that the present invention is not restricted to application in an aircraft, but rather may also be applied in other general data bus systems.

Figure 1:
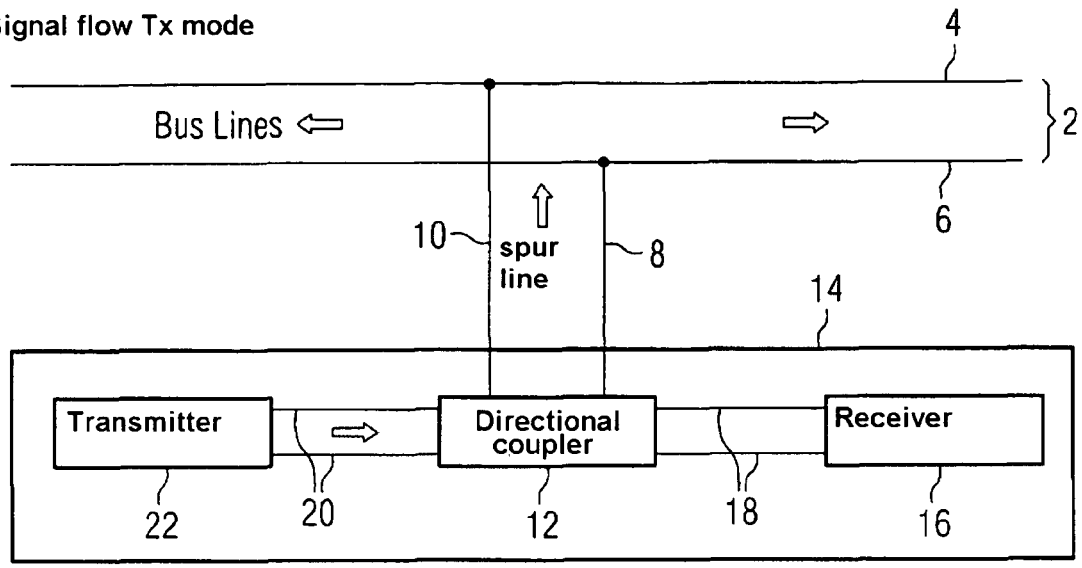
FIG. 1 shows a simplified schematic circuit diagram of a first exemplary embodiment of a data bus system according to the present invention, the signal flow being shown in $T_x$ mode.

FIG. 1 shows a simplified schematic circuit diagram of a first exemplary embodiment of a data bus system according to the present invention, the signal flow being shown in $T_x$ mode. As may be inferred from FIG. 1, the data bus 2 has two data bus lines 4 and 6. The data bus lines 4 and 6 are connected to the terminal 14 using spur lines 8 and 10. In particular, the spur lines 8 and 10 are connected to a directional coupler 12, which is connected on one side via the lines 18 to a receiver 16 of the terminal 14 and on the other side via the lines 20 to a transmitter 22 of the terminal.

The gray arrows are to indicate the signal flow in the $T_x$ (transmit) mode. As may be inferred from FIG. 1, a signal is transmitted by the transmitter 22 via the line 20 to the directional coupler 12. The directional coupler 12 does not relay the signal to the receiver 16. However, the directional coupler 12 relays the signal transmitted by the transmitter 22 via the spur lines 8 and 12 to the bus lines 4 and 6 of the data bus, where the signal is also distributed further.

Figure 2:
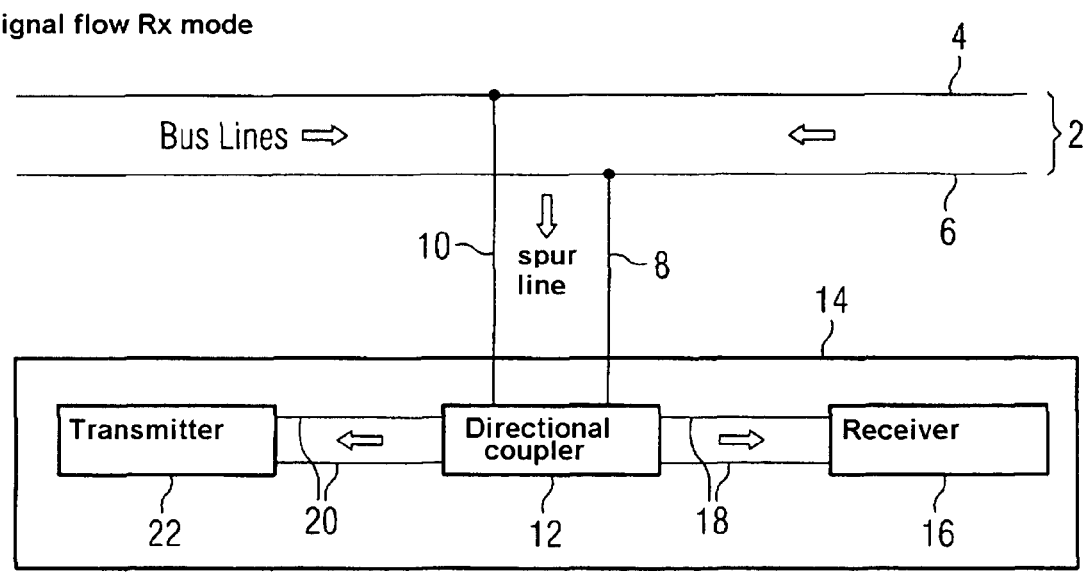
FIG. 2 shows a simplified schematic circuit diagram of the first exemplary embodiment of the data bus system from FIG. 1, the signal flow being shown in $R_x$ mode.

FIG. 2 shows a simplified schematic circuit diagram of the first exemplary embodiment of the data bus system from FIG. 1, the signal flow being shown in $R_x$ (receive) mode. Transmit mode means that the corresponding terminal transmits data via the data bus to another terminal. Receive mode means that the terminal receives data via the data bus.

As may be inferred from FIG. 2, incoming data from the data bus 2 is relayed via the spur lines 8 or 10 to the directional coupler 12, which relays the data both to the transmitter 22 via the lines 20 and also via the lines 18 and the receiver 16.

Therefore, as may be inferred from FIGS. 1 and 2, the receiver 16 is isolated from the transmitter 22 by the directional coupler 12. When the transmitter 22 is not transmitting, the input impedance of the directional coupler is adapted, so that no reflections arise on the bus lines 4 and 6 which may interfere with the bus signal and/or the receiver. This advantageously allows reliable and improved operation of the data bus system.

Figure 3:
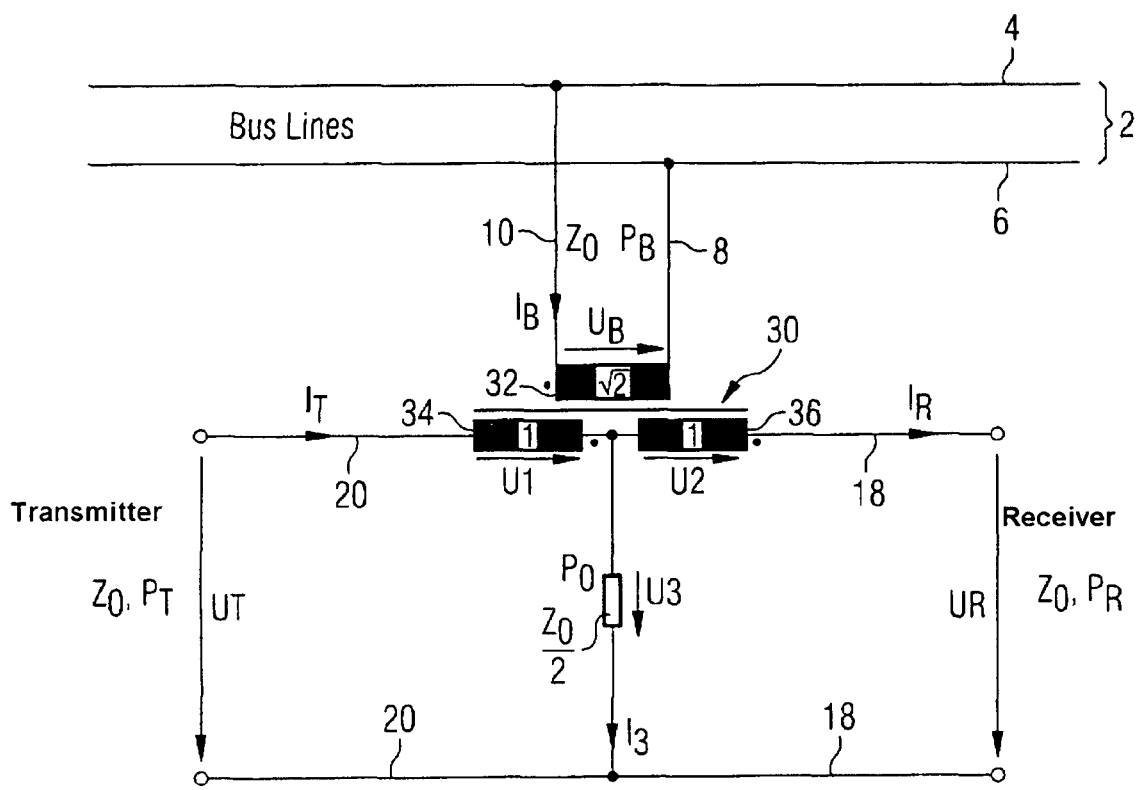
FIG. 3 shows a simplified block circuit diagram of a second exemplary embodiment of a data bus system according to the present invention.

FIG. 3 shows a simplified circuit diagram of a second exemplary embodiment of a data bus system according to the present invention. In FIG. 3, identical reference numbers as in FIGS. 1 and 2 are used for identical or corresponding elements. For the sake of simplicity, the transmitter and the receiver are not shown in FIG. 3, only the lines 18 and 20 which go to the receiver and transmitter, respectively.

As may be inferred from FIG. 3, the transformer 30 is positioned between the data bus 2 having the data bus lines 4 and 6. The transformer 30 has a primary coil 32 and two secondary coils 34 and 36. The secondary coils each have an equal number of turns. The transformer 30 essentially has a turn ratio of primary coil to secondary coil of 1.141 to 2×1.000 ($\sqrt{2}$ to 2×1). The following voltages and currents thus result with the impedance $Z_0$ for the transmitter output at rest and the receiver output at rest.

$$U_T = I_T \cdot Z_0$$

$$I_B = \frac{1}{\sqrt{2}} I_T$$

$$U_B = I_B \cdot Z_0 = \frac{1}{\sqrt{2}} U_T$$

$$P_B = U_B \cdot I_B = \frac{1}{\sqrt{2}} U_T \cdot \frac{1}{\sqrt{2}} I_T = \frac{1}{2} P_T$$

$$U_1 = U_2 = \frac{1}{\sqrt{2}} U_B = \frac{1}{2} U_T$$

$$\Rightarrow \ldots U_R = U_T - U_1 - U_2 = 0$$

$$\Rightarrow \ldots P_R = 0$$

(power at receiver input)

$$U_3 = U_T - U_1 = \frac{1}{2} U_T$$

-continued $$P_L = U_3 \cdot I_3$$
$$= U_3 \cdot \frac{U_3}{0.5 \cdot Z_0}$$
$$= U_3 \cdot \frac{2 \cdot U_3}{Z_0}$$
$$= U_3 \cdot \frac{U_T}{Z_0}$$
$$= U_3 \cdot I_T$$
$$= \frac{1}{2} U_T \cdot I_T$$
$$= \frac{1}{2} P_T$$

(power transmitted to the bus)

$$U_B = I_B \cdot Z_0$$

$$P_B = U_B \cdot I_B = Z_0 \cdot I_B^2$$

$$U_1 = U_2 = \frac{1}{\sqrt{2}} U_B$$

$$I_1 = I_2 = \frac{1}{\sqrt{2}} I_B$$

$$I_3 = I_R - I_T = 0$$

$$\ldots \Rightarrow P_L = 0$$

$$U_R = I_R \cdot Z_0$$

$$P_R = U_R \cdot I_R = Z_0 \cdot I_R^2 = \frac{1}{2} Z_0 \cdot I_B^2 = \frac{1}{2} P_B$$

(received power)

$$P_T = U_T \cdot I_T = Z_0 \cdot I_T^2 = \frac{1}{2} P_B$$

(power fraction at an inactive transmitter gate)

In this table, as may be inferred from FIG. 1, the current $I_B$ is the current in the primary coil 32 and the voltage $U_B$ is the voltage via the primary coil. $P_B$ is the incoming bus line. The current $I_T$ is the current flowing from the transmitter with the impedance $Z_0$ with the power $P_T$ into the secondary coil, the voltage via the secondary coil 34 being identified with $U_1$. The current $I_R$ is the current flowing in the receiver, the receiver having an impedance of $Z_0$ and a receiving power of $P_R$. The voltage via the secondary coil 36 is identified with $U_2$. In the equivalent circuit diagram, $I_3$ identifies the current which flows through the impedance $Z_0/2$, which is connected between the secondary coils 34 and 36 and a transmitter and receiver input. $P_0$ identifies the power via $Z_0/2$ and $U_3$ identifies the voltage via this impedance. The voltage $U_T$ identifies the input voltage of the transmitter and the voltage $U_R$ identifies the input voltage of the receiver.

As may be inferred from the above description, the present invention of allows the number of coupling transformers which are necessary for the electrical isolation of data bus and terminal to be halved in comparison to the known data bus systems. In this way, the costs for coupling transformers are halved, i.e., a favorable data bus system is provided. In addition, the signal distortion on the data bus due to reflections is significantly reduced.

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. A data bus system, comprising
a data bus and a terminal;
wherein the data bus has a first data line and a second data line;
wherein the terminal is connected via a directional coupler to the first and the second data lines in order to transmit and receive data via the data bus;
wherein the terminal has a transmitter and a receiver, the receiver isolated from the transmitter by the directional coupler;
wherein the direction coupler includes a transformer having a primary coil, a first secondary coil, and a second secondary coil;
wherein one end of an impedance is coupled to the first and second secondary coils of the transformer and another end of the impedance is coupled to the transmitter and the receiver;
wherein the directional coupler relays an input signal coming from the bus line to the transmitter and the receiver;
wherein the directional coupler relays an output signal going from the transmitter to the data bus, but not to the receiver.

2. The data bus system according to claim 1, wherein the directional coupler is designed so that in the event of a non-transmitting transmitter, the impedance is adapted in such a way that no reflections arise on the data bus.

3. The data bus system according to claim 1,
wherein the data bus system is designed as a data bus for an aircraft; and
wherein the terminal is an aircraft system in the aircraft.

4. The data bus system according to claim 1, wherein the transformer has a turn ratio of primary $\sqrt{2}$ to secondary 2×1.

5. A terminal for connection and operation with a data bus, wherein the data bus has a first and a second data line;
wherein the terminal comprises:
a directional coupler; and
wherein the terminal is connected to the first and the second data lines using the directional coupler in order to transmit and receive data via the data bus;
wherein the terminal has a transmitter and a receiver, the receiver isolated from the transmitter by the directional coupler;
wherein the direction coupler includes a transformer having a primary coil, a first secondary coil, and a second secondary coil;
wherein one end of an impedance is coupled to the first and second secondary coils of the transformer and another end of the impedance is coupled to the transmitter and the receiver;
wherein the directional coupler relays an input signal coming from the bus line to the transmitter and the receiver; and
wherein the directional coupler relays an output signal going from the transmitter to the data bus to the data bus, but not to the receiver.

6. The terminal according to claim 5,
wherein the directional coupler is designed so that in the event of a non-transmitting transmitter, the impedance is adapted in such a way that no reflections arise on the data bus.

7. The terminal according to claim 5,
wherein the terminal is part of an aircraft system of an aircraft.

8. The terminal according to claim 5, wherein the transformer has a turn ratio of primary $\sqrt{2}$ to secondary 2×1.

9. A data transmission method for transmitting data between a data bus and a terminal,
wherein the data bus has a first and a second data line, the method comprising:
connecting the first and the second data lines to the terminal using a directional coupler to transmit and receive data via the data bus;
isolating a receiver and a transmitter of a terminal using a directional coupler;
adapting an impedance of the directional coupler in the event of a non-transmitting transmitter in such a way that no reflections arise on the data bus;
wherein the direction coupler includes a transformer having a primary coil, a first secondary coil, and a second secondary coil; and
wherein one end of the impedance is coupled to the first and second secondary coils of the transformer and another end of the impedance is coupled to the transmitter and the receiver.

10. The method according to claim 9,
wherein the method is used on a data bus of an aircraft.

* * * * *

UNITED STATES PATENT AND TRADEMARK OFFICE
CERTIFICATE OF CORRECTION

PATENT NO. : 7,564,324 B2  Page 1 of 1
APPLICATION NO. : 11/016792
DATED : July 21, 2009
INVENTOR(S) : Norbert Rieckmann It is certified that error appears in the above-identified patent and that said Letters Patent is hereby corrected as shown below:

Col. 1, Line 38, please delete "," after --present invention--.

Col. 4, Line 57, delete "of" after --present invention--.

Col. 6, Line 12, delete "to the data bus" after --to the date bus--.

Signed and Sealed this

Third Day of August, 2010

David J. Kappos
*Director of the United States Patent and Trademark Office*